US00RE45125E

(19) United States
(12) Reissued Patent
Imai et al.

(10) Patent Number: US RE45,125 E
(45) **Date of Reissued Patent: *Sep. 9, 2014**

(54) INTEGRATED CIRCUIT

(71) Applicants: Tomohiro Imai, Kanagawa (JP); Ayako Horiuchi, Kanagawa (JP); Akihiko Nishio, Kanagawa (JP); Kenichi Kuri, Kanagawa (JP); Hiroaki Morino, Tokyo (JP)

(72) Inventors: Tomohiro Imai, Kanagawa (JP); Ayako Horiuchi, Kanagawa (JP); Akihiko Nishio, Kanagawa (JP); Kenichi Kuri, Kanagawa (JP); Hiroaki Morino, Tokyo (JP)

(73) Assignee: Panasonic Intellectual Property Corporation of America, Torrance, CA (US)

( * ) Notice: This patent is subject to a terminal disclaimer.

(21) Appl. No.: 13/802,120

(22) Filed: Mar. 13, 2013

Related U.S. Patent Documents

Reissue of:

(64) Patent No.: 7,912,423
Issued: Mar. 22, 2011
Appl. No.: 11/908,486
PCT Filed: Mar. 13, 2006
PCT No.: PCT/JP2006/304901
§ 371 (c)(1),
(2), (4) Date: Dec. 10, 2007
PCT Pub. No.: WO2006/098273
PCT Pub. Date: Sep. 21, 2006

U.S. Applications:

(63) Continuation of application No. 13/444,664, filed on Apr. 11, 2012, now Pat. No. Re. 44,200, which is an application for the reissue of Pat. No. 7,912,423.

(30) Foreign Application Priority Data

Mar. 14, 2005 (JP) ..... 2005071775

(51) Int. Cl.
*H04B 15/00* (2006.01)
*H04B 7/15* (2006.01)

(52) U.S. Cl.
USPC ..... 455/23; 455/7; 455/11.1; 455/502

(58) Field of Classification Search
USPC ..... 455/23, 11.1, 7, 502, 9, 15, 16, 17, 24, 455/458, 18, 42; 370/338
See application file for complete search history.

(56) References Cited

U.S. PATENT DOCUMENTS

2004/0198467 A1* 10/2004 Orlik et al. ..... 455/574
2005/0014464 A1* 1/2005 Larsson ..... 455/11.1
2007/0160014 A1* 7/2007 Larsson ..... 370/338

FOREIGN PATENT DOCUMENTS

JP 2-295234 12/1990
JP 2-295234 A 12/1990

(Continued)

OTHER PUBLICATIONS

Hasegawa et al., "Multi-hop System for Adaptive Modulation using Regenerating Fixed Hop Stations," Technical Report of IEICE, A-P2004-189, RCS2004-210, Oct. 2004, pp. 57-61.

(Continued)

*Primary Examiner* — John J Lee
(74) *Attorney, Agent, or Firm* — Seed IP Law Group PLLC

(57) ABSTRACT

A wireless communication system enabling multihop communication while maintaining the system throughput and preventing degradation of the user throughput. In the system, a BS (base station) determines the relaying method (whether an RS performs reproduction relay or nonreproduction relay) of the RS (relaying station) and the MCS of multihop communication according to the reception quality (the line quality among an MS2, the RS, and the BS) of the pilot for nonreproduction relay, the reception quality (the line quality between the RS and the BS) of the pilot 2 for reproduction relay, and the line quality (the line quality between the MS2 and the RS) measured at the RS. The determination result is transmitted as relay information to the RS and to the MS2 (a mobile station (2)) through the RS. The MS2 encodes and modulates the uplink data with the MCS based on the relay information and transmits the data to the RS. The RS relays the uplink data while selecting nonreproduction relay or reproduction relay according to the relay information.

9 Claims, 19 Drawing Sheets

| CHANNEL QUALITY | | | RELAY SCHEME/MCS | | | RELAY INFORMATION |
|---|---|---|---|---|---|---|
| REGENERATIVE RELAY | | NON-REGENERATIVE RELAY | | | | |
| MS2-RS | RS-BS | MS2-RS-BS | MS2-RS | RS-BS | bit/T | |
| GOOD | GOOD | GOOD | NON-REGENERATIVE/16QAM | | 4 | 2 |
| | | NORMAL | NON-REGENERATIVE/QPSK | | 2 | 1 |
| | | POOR | REGENERATIVE/16QAM | REGENERATIVE/16QAM | 2 | 5 |
| | NORMAL | NORMAL | NON-REGENERATIVE/QPSK | | 2 | 1 |
| | | POOR | REGENERATIVE/16QAM | REGENERATIVE/QPSK | 1.33 | 4 |
| | POOR | | NON-REGENERATIVE/BPSK | | 1 | 0 |
| NORMAL | GOOD | NORMAL | NON-REGENERATIVE/QPSK | | 2 | 1 |
| | | POOR | REGENERATIVE/QPSK | REGENERATIVE/16QAM | 1.33 | 3 |
| | NORMAL | NORMAL | NON-REGENERATIVE/QPSK | | 2 | 1 |
| | | POOR | NON-REGENERATIVE/BPSK | | 1 | 0 |
| | POOR | | NON-REGENERATIVE/BPSK | | 1 | 0 |
| POOR | GOOD | POOR | NON-REGENERATIVE/BPSK | | 1 | 0 |
| | NORMAL | | | | | |
| | POOR | | | | | |

(56) References Cited

FOREIGN PATENT DOCUMENTS

| | | | |
|---|---|---|---|
| JP | 4-196626 | | 7/1992 |
| JP | 4-196626 | A | 7/1992 |
| JP | 2003-018059 | | 1/2003 |
| JP | 2003-18059 | A | 1/2003 |
| WO | 2004/107693 | | 12/2004 |
| WO | 2004/107693 | A1 | 12/2004 |

OTHER PUBLICATIONS

International Search Report for corresponding International Patent Appl. No. PCT/JP2006/304901 dated May 16, 2006, 3 pages.

Supplementary Search Report for corresponding EP Patent Appl. No. 06728966.0 dated Apr. 27, 2010 3 pages.

PCT International Search Report dated May 16, 2006.

R. Hasegawa, et al.; "Multi-hop System for Adaptive Modulation using Regenerating Fixed Hop Stations," Technical Report of IEICE, A-P2004-189, RCS2004-210, Oct. 2004, pp. 57-61.

Supplementary European Search Report dated Apr. 27, 2008.

International Search Report dated May 16, 2006.

* cited by examiner

| | CHANNEL QUALITY |
|---|---|
| GOOD | 10dB≦SNR |
| NORMAL | 5dB≦SNR<10dB |
| POOR | SNR<5dB |

FIG.5

| CHANNEL QUALITY | | | RELAY SCHEME/MCS | | | RELAY INFORMATION |
|---|---|---|---|---|---|---|
| REGENERATIVE RELAY | | NON-REGENERATIVE RELAY | | | | |
| MS2-RS | RS-BS | MS2-RS-BS | MS2-RS | RS-BS | bit/T | |
| GOOD | GOOD | GOOD | NON-REGENERATIVE/16QAM | | 4 | 2 |
| | | NORMAL | NON-REGENERATIVE/QPSK | | 2 | 1 |
| | | POOR | REGENERATIVE/16QAM | REGENERATIVE/16QAM | 2 | 5 |
| | NORMAL | NORMAL | NON-REGENERATIVE/QPSK | | 2 | 1 |
| | | POOR | REGENERATIVE/16QAM | REGENERATIVE/QPSK | 1.33 | 4 |
| | POOR | | NON-REGENERATIVE/BPSK | | 1 | 0 |
| NORMAL | GOOD | NORMAL | NON-REGENERATIVE/QPSK | | 2 | 1 |
| | | POOR | REGENERATIVE/QPSK | REGENERATIVE/16QAM | 1.33 | 3 |
| | NORMAL | NORMAL | NON-REGENERATIVE/QPSK | | 2 | 1 |
| | | POOR | NON-REGENERATIVE/BPSK | | 1 | 0 |
| | POOR | | NON-REGENERATIVE/BPSK | | 1 | 0 |
| POOR | GOOD | POOR | NON-REGENERATIVE/BPSK | | 1 | 0 |
| | NORMAL | | | | | |
| | POOR | | | | | |

FIG.6

| CHANNEL QUALITY | | MCS | | bit/T |
|---|---|---|---|---|
| MS2-RS | RS-BS | MS2-RS | RS-BS | |
| GOOD | GOOD | 16QAM | 16QAM | 2 |
| GOOD | NORMAL | 16QAM | QPSK | 1.33 |
| GOOD | POOR | 16QAM | BPSK | 0.8 |
| NORMAL | GOOD | QPSK | 16QAM | 1.33 |
| NORMAL | NORMAL | QPSK | QPSK | 1 |
| NORMAL | POOR | QPSK | BPSK | 0.66 |
| POOR | GOOD | BPSK | 16QAM | 0.8 |
| POOR | NORMAL | BPSK | QPSK | 0.66 |
| POOR | POOR | BPSK | BPSK | 0.5 |

FIG.7

| CHANNEL QUALITY | MCS | bit/T |
|---|---|---|
| MS2-RS-BS | MS2-RS-BS | |
| GOOD | 16QAM | 4 |
| NORMAL | QPSK | 2 |
| POOR | BPSK | 1 |

FIG.8

| CHANNEL QUALITY | | | MCS | | | | |
|---|---|---|---|---|---|---|---|
| REGENERATIVE RELAY | | NON-REGENERATIVE RELAY | REGENERATIVE RELAY | | | NON-REGENERATIVE RELAY | |
| MS2-RS | RS-BS | MS2-RS-BS | MS2-RS | RS-BS | bit/T | MS2-RS-BS | bit/T |
| GOOD | GOOD | GOOD | 16QAM | 16QAM | 2 | 16QAM | 4 |
| | | NORMAL | | | 2 | QPSK | 2 |
| | | POOR | | | 2 | BPSK | 1 |
| | NORMAL | NORMAL | | QPSK | 1.33 | QPSK | 2 |
| | | POOR | | | 1.33 | BPSK | 1 |
| | POOR | | | BPSK | 0.8 | | 1 |
| NORMAL | GOOD | NORMAL | QPSK | 16QAM | 1.33 | QPSK | 2 |
| | | POOR | | | 1.33 | BPSK | 1 |
| | NORMAL | NORMAL | | QPSK | 1 | QPSK | 2 |
| | | POOR | | | 1 | BPSK | 1 |
| | POOR | | | BPSK | 0.66 | | 1 |
| POOR | GOOD | POOR | BPSK | 16QAM | 0.8 | BPSK | 1 |
| | NORMAL | | | QPSK | 0.66 | | |
| | POOR | | | BPSK | 0.5 | | |

FIG.9

| CHANNEL QUALITY | | | RELAY SCHEME/MCS | | | RELAY INFORMATION |
|---|---|---|---|---|---|---|
| REGENERATIVE RELAY | | NON-REGENERATIVE RELAY | | | | |
| MS-RS | RS-BS | MS-RS-BS | MS-RS | RS-BS | bit/T | |
| GOOD | GOOD | GOOD | NON-REGENERATIVE/16QAM | | 4 | 2 |
| | GOOD | NORMAL | REGENERATIVE/16QAM | REGENERATIVE/16QAM | 2 | 8 |
| | | POOR | | | | |
| | NORMAL | NORMAL | NON-REGENERATIVE/QPSK | | 2 | 1 |
| | NORMAL | POOR | REGENERATIVE/16QAM | REGENERATIVE/QPSK | 1.33 | 7 |
| | POOR | POOR | NON-REGENERATIVE/BPSK | | 1 | 0 |
| NORMAL | GOOD | NORMAL | REGENERATIVE/QPSK | REGENERATIVE/16QAM | 1.33 | 6 |
| | | POOR | | | | |
| | NORMAL | NORMAL | NON-REGENERATIVE/QPSK | | 2 | 1 |
| | NORMAL | POOR | REGENERATIVE/QPSK | REGENERATIVE/QPSK | 1 | 5 |
| | POOR | POOR | NON-REGENERATIVE/BPSK | | 1 | 0 |
| POOR | GOOD | POOR | REGENERATIVE/BPSK | REGENERATIVE/16QAM | 0.8 | 4 |
| | NORMAL | POOR | REGENERATIVE/BPSK | REGENERATIVE/QPSK | 0.66 | 3 |
| | POOR | POOR | NON-REGENERATIVE/BPSK | | 1 | 0 |

FIG.12

| CHANNEL QUALITY | | | | RELAY SCHEME/DIRECT CONNECTION/MCS | | | RELAY INFORMATION |
|---|---|---|---|---|---|---|---|
| REGENERATIVE RELAY | | NON-REGENERATIVE RELAY | DIRECT CONNECTION | | | | |
| MS2-RS | RS-BS | MS2-RS-BS | MS2-BS | MS2-RS | RS-BS | bit/T | |
| GOOD | GOOD | GOOD | NORMAL | NON-REGENERATIVE/16QAM | | 4 | 2 |
| | | | POOR | | | | |
| | | NORMAL | NORMAL | DIRECT CONNECTION/QPSK | | 2 | 0 |
| | | | POOR | NON-REGENERATIVE/QPSK | | 2 | 1 |
| | | POOR | NORMAL | DIRECT CONNECTION/QPSK | | 2 | 0 |
| | | | POOR | REGENERATIVE/16QAM | REGENERATIVE/16QAM | 2 | 5 |
| | NORMAL | NORMAL | NORMAL | DIRECT CONNECTION/QPSK | | 2 | 0 |
| | | | POOR | NON-REGENERATIVE/QPSK | | 2 | 1 |
| | | POOR | NORMAL | DIRECT CONNECTION/QPSK | | 2 | 0 |
| | | | POOR | REGENERATIVE/16QAM | REGENERATIVE/QPSK | 1.33 | 4 |
| | POOR | | NORMAL | DIRECT CONNECTION/QPSK | | 2 | 0 |
| | | | POOR | DIRECT CONNECTION/BPSK | | 1 | |
| NORMAL | GOOD | NORMAL | NORMAL | DIRECT CONNECTION/QPSK | | 2 | 0 |
| | | | POOR | NON-REGENERATIVE/QPSK | | 2 | 1 |
| | | POOR | NORMAL | DIRECT CONNECTION/QPSK | | 2 | 0 |
| | | | POOR | REGENERATIVE/QPSK | REGENERATIVE/16QAM | 1.33 | 3 |
| | NORMAL | NORMAL | NORMAL | DIRECT CONNECTION/QPSK | | 2 | 0 |
| | | | POOR | NON-REGENERATIVE/QPSK | | 2 | 1 |
| | | POOR | NORMAL | DIRECT CONNECTION/QPSK | | 2 | 0 |
| | | | POOR | DIRECT CONNECTION/BPSK | | 1 | |
| | POOR | | NORMAL | DIRECT CONNECTION/QPSK | | 2 | |
| | | | POOR | DIRECT CONNECTION/BPSK | | 1 | |
| POOR | GOOD | POOR | NORMAL | DIRECT CONNECTION/QPSK | | 2 | 0 |
| | | | POOR | DIRECT CONNECTION/BPSK | | 1 | |
| | NORMAL | | NORMAL | DIRECT CONNECTION/QPSK | | 2 | |
| | | | POOR | DIRECT CONNECTION/BPSK | | 1 | |
| | POOR | | NORMAL | DIRECT CONNECTION/QPSK | | 2 | |
| | | | POOR | DIRECT CONNECTION/BPSK | | 1 | |

FIG.14

| CHANNEL QUALITY | | RELAY SCHEME/MCS | | bit/T | RELAY INFORMATION |
|---|---|---|---|---|---|
| RS-BS | MS2-RS-BS | MS2-RS | RS-BS | | |
| GOOD | GOOD | NON-REGENERATIVE/16QAM | | 4 | 2 |
| | NORMAL | NON-REGENERATIVE/QPSK | | 2 | 1 |
| | POOR | REGENERATIVE | REGENERATIVE/16QAM | 0.8～1.33 | 4 |
| NORMAL | NORMAL | NON-REGENERATIVE/QPSK | | 2 | 1 |
| | POOR | REGENERATIVE | REGENERATIVE/QPSK | 0.66～1.33 | 3 |
| POOR | POOR | NON-REGENERATIVE/BPSK | | 1 | 0 |

FIG.17

| CHANNEL QUALITY | | RELAY SCHEME/MCS | | bit/T | RELAY INFORMATION |
|---|---|---|---|---|---|
| RS-BS | MS2-RS-BS | MS2-RS | RS-BS | | |
| GOOD | GOOD | NON-REGENERATIVE/16QAM | | 4 | 2 |
| | NORMAL | REGENERATIVE | REGENERATIVE/16QAM | 0.8～1.33 | 4 |
| | POOR | REGENERATIVE | REGENERATIVE/16QAM | 0.8～1.33 | 4 |
| NORMAL | NORMAL | NON-REGENERATIVE/QPSK | | 2 | 1 |
| | POOR | REGENERATIVE | REGENERATIVE/QPSK | 0.66～1.33 | 3 |
| POOR | POOR | NON-REGENERATIVE/BPSK | | 1 | 0 |

FIG.19

| CHANNEL QUALITY | | | RELAY SCHEME/ DIRECT CONNECTION/MCS | | bit/T | RELAY INFORMATION |
|---|---|---|---|---|---|---|
| RS-BS | MS2-RS-BS | MS2-BS | MS2-RS | RS-BS | | |
| GOOD | GOOD | NORMAL | NON-REGENERATIVE/16QAM | | 4 | 2 |
| | | POOR | | | | |
| | NORMAL | NORMAL | DIRECT CONNECTION/QPSK | | 2 | 0 |
| | | POOR | NON-REGENERATIVE/QPSK | | 2 | 1 |
| | POOR | NORMAL | DIRECT CONNECTION/QPSK | | 2 | 0 |
| | | POOR | REGENERATIVE | REGENERATIVE/16QAM | 0.8～1.33 | 3 |
| NORMAL | NORMAL | NORMAL | DIRECT CONNECTION/QPSK | | 2 | 0 |
| | | POOR | NON-REGENERATIVE/QPSK | | 2 | 1 |
| | POOR | NORMAL | DIRECT CONNECTION/QPSK | | 2 | 0 |
| | | POOR | DIRECT CONNECTION/BPSK | | 1 | |
| POOR | POOR | NORMAL | DIRECT CONNECTION/QPSK | | 2 | 0 |
| | | POOR | DIRECT CONNECTION/BPSK | | 1 | |

FIG.20

INTEGRATED CIRCUIT

Matter enclosed in heavy brackets [ ] appears in the original patent but forms no part of this reissue specification; matter printed in italics indicates the additions made by reissue.

*CROSS-REFERENCE TO CO-PENDING REISSUE APPLICATIONS*

*More than one reissue application has been filed for the reissue of U.S. Pat. No. 7,912,423. The reissue applications are application Ser. Nos. 13/802,120 (the present application), 13/444,664, and 13/802,109; application Ser. Nos. 13/802,109 and 13/802,120 are continuations of patent application Ser. No. 13/444,664 filed Apr. 11, 2012 now U.S. Pat. No. Re. 44,200.*

TECHNICAL FIELD

The present invention relates to a wireless communication system.

BACKGROUND ART

In recent years, wireless cellular systems typified by cellular telephone systems and the like have diversified their service patterns, and have been demanded to transmit large-capacity data such as static images, moving pictures and the like as well as speech data. To meet such demands, it has been studied actively to transmit large-capacity data using a high-frequency radio band.

In using high-frequency radio band, the degree of attenuation due to the transmission distance becomes a problem. In other words, high transmission rates are obtained at locations near the transmitting station, but only low transmission rates are achieved at locations a predetermined distance or more apart from the transmitting station. Accordingly, to consider the actual operations of the communication system, it is necessary to cover a service area by installing a large number of base stations. However, installation of a large number of base stations requires significant cost. From such circumstances, a technique is strongly demanded that implements large-capacity communication service without increasing the number of base stations to install.

There is multi-hop communication, as one of methods for expanding the service area of a base station. This technique is a communication technique where a relay station installed in the base station service area relays and transmits a signal of a mobile station out of the service area to the base station (for example, see Non-Patent Document 1).

Multi-hop communication is broadly divided into regenerative relay and non-regenerative relay. In regenerative relay, a relay station once demodulates and decodes a received signal, encodes and modulates the signal again using a modulation scheme and coding rate (Modulation and Coding Scheme: MCS) in accordance with channel quality, and then transmits the result. In contrast, in non-regenerative relay, the relay station amplifies a received signal and transmits the signal without change. In comparison with non-regenerative relay, regenerative relay provides an advantage of enabling a relay using an adequate MCS in accordance with channel quality, yet also has a disadvantage of increasing the delay due to relay. Meanwhile, non-regenerative relay provides an advantage of decreasing the delay due to relay yet also has a disadvantage of making the SNR degrade by amplifying noise. Non-patent Document 1: Hasegawa et al. "Multi-hop System for Adaptive Modulation using Regenerating Fixed Hop Stations" Technical Report of IEICE, October 2004, A/P 2004-189, RCS2004-210, pp. 57-61.

DISCLOSURE OF INVENTION

Problems to be Solved by the Invention

In regenerative relay in multi-hop communication, the throughput may decrease as the number of mobile stations using a single relay station increases. For example, when mobile station 1 (MS1) is communicating with a base station (BS) via a relay station (RS) by regenerative relay as shown in FIG. 1, and mobile station 2 (MS2) joins in as shown in FIG. 2, since communication occasions of mobile station 1 decrease due to relay processing for mobile station 2, user throughput of mobile station 1 decreases. Further, as shown in FIG. 2, when the channel quality between mobile station 2 and the relay station is poorer than the channel quality between mobile station 1 and the relay station, system throughput (average transmission rate of the entire system) is lower than before mobile station 2 joins in.

In view of these respects, it is an object of the present invention to provide a wireless communication system that maintains system throughput and prevents a decrease in user throughput in multi-hop communication.

Means for Solving the Problem

In the wireless communication system of the present invention, a mobile station and a base station communicate via a relay station, and this wireless communication system adopts a configuration of [switching] *selecting from* two relay schemes of *a* non-regenerative relay for amplifying a signal without [changing a modulation scheme] *regenerating the signal with a decoding-reencoding process* and performing a relay transmission *of the amplified signal*, and *a* regenerative relay for [changing a modulation scheme of a signal according to channel quality] *regenerating a signal with a decoding-reencoding process* and performing a relay transmission *of the regenerated signal*, based on a combination of channel quality in *the* non-regenerative relay and channel quality in *the* regenerative relay.

Advantageous Effect of the Invention

According to the invention, it is possible to maintain system throughput and prevent a decrease in user throughput.

BRIEF DESCRIPTION OF DRAWINGS

FIG. 5 is classification of channel quality according to Embodiment 1 of the invention;

FIG. 6 is a reference table according to Embodiment 1 of the invention;

FIG. 7 is a table showing relationship between the channel quality and MCS in a regenerative relay according to Embodiment 1 of the invention;

FIG. 8 is a table showing relationship between the channel quality and MCS in a non-regenerative relay according to Embodiment 1 of the invention;

FIG. 9 is a table obtained by combining the table as shown in FIG. 7 and the table as shown in FIG. 8;

FIG. 12 is another reference table according to Embodiment 1 of the invention;

FIG. 14 is still another reference table according to Embodiment 1 of the invention;

FIG. 17 is a reference table according to Embodiment 2 of the invention;

FIG. 19 is another reference table according to Embodiment 2 of the invention; and FIG. 20 is still another reference table according to Embodiment 2 of the invention.

BEST MODE FOR CARRYING OUT THE INVENTION

Embodiments of the present invention will be descried below in detail with reference to accompanying drawings.

Embodiment 1

In this Embodiment, a base station determines the relay scheme and MCS taking into account both the channel quality of regenerative relay and the channel quality of non-regenerative relay.

Figure 1:
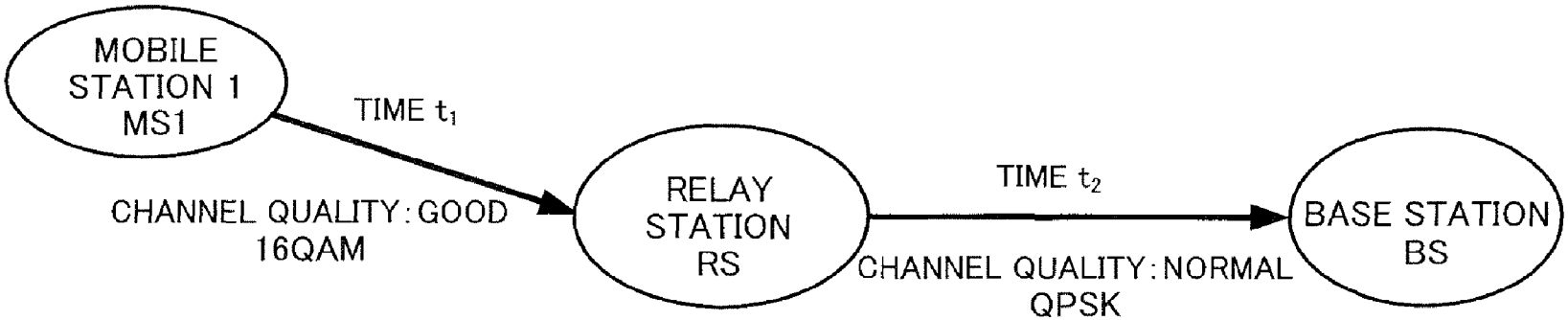
PRIOR ART FIG.1
FIG. 1 is a schematic diagram of a conventional multi-hop communication system.
Figure 2:
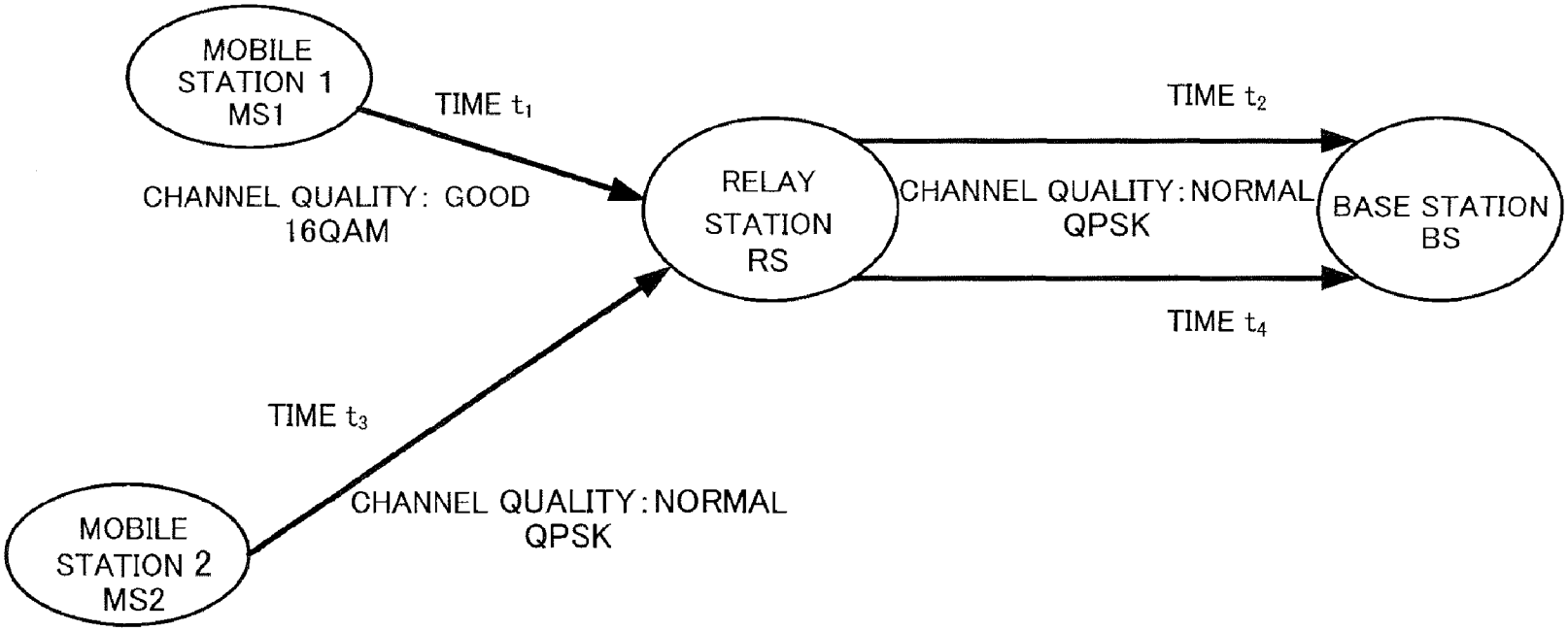
PRIOR ART FIG.2
FIG. 2 is another schematic diagram of the conventional multi-hop communication system.
Figure 3:
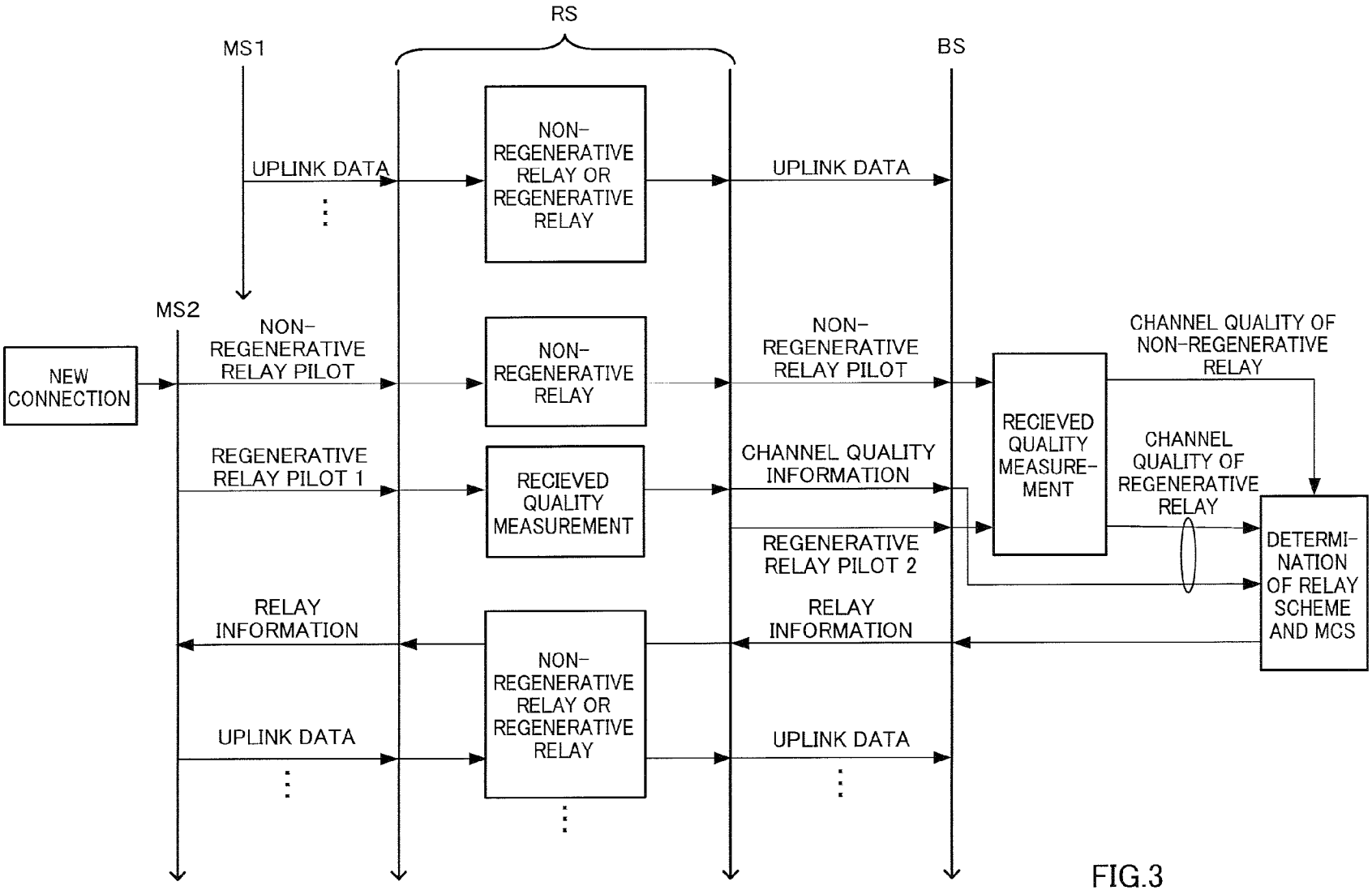
FIG. 3 is an operation sequence in a multi-hop communication system according to Embodiment 1 of the invention.

Described first is an operation sequence in a multi-hop communication system according to this Embodiment. The operation sequence is shown in FIG. 3. FIG. 3 shows a case where MS2 (mobile station 2) joins in where MS1 (mobile station 1) is communicating with a BS (base station) via a RS (relay station). In addition, to avoid complexity in descriptions, the following descriptions are limited to uplink data multi-hop communication, but downlink data multi-hop communication is performed as with uplink data.

Upon newly joining in, the MS2 transmits a pilot signal (non-regenerative relay pilot) for measuring channel quality between the MS2 and the BS via the RS (MS2-RS-BS channel quality) and a pilot signal (regenerative relay pilot 1) for measuring channel quality between the MS2 and the RS (MS2-RS channel quality), to the RS. At this point, the MS2 adds a flag indicative of non-regenerative relay pilot and a flag indicative of regenerative relay pilot 1 to these pilot signals. In addition, the transmission order of non-regenerative relay pilot and regenerative relay pilot 1 is not limited.

The RS receiving these two kinds of pilot signals performs non-regenerative relay pilot processing on non-regenerative relay pilot to transmit to the BS. In other words, the RS maintains the MCS and amplifies the non-regenerative relay pilot and transmits the result to the BS. Further, the RS measures the received quality (MS2-RS channel quality) of regenerative relay pilot 1, and transmits channel quality information to the BS. Furthermore, the RS transmits a new pilot signal (regenerative relay pilot 2) for measurement of channel quality of a channel between the RS and the BS (RS-BS channel quality) to the BS. At this point, the RS adds a flag indicative of regenerative relay pilot 2 to regenerative relay pilot 2.

Next, the BS measures the received quality (MS2-RS-BS channel quality) of the non-regenerative relay pilot. Further, the BS measures the received quality (RS-BS channel quality) of regenerative relay pilot 2. By this means, the BS obtains the MS2-RS-BS channel quality as the channel quality of non-regenerative relay, and obtains the RS-BS channel quality as the channel quality of regenerative relay. Furthermore, the BS obtains the MS2-RS channel quality as the channel quality of regenerative relay from the received channel quality information. Then, based on these three kinds of channel quality, the BS determines the relay scheme of the RS (whether the RS performs regenerative relay or non-regenerative relay) and MCS in multi-hop communication. The determination results are transmitted to the RS as relay information. Further, this relay information is also transmitted to the MS2 via the RS.

The MS2 encodes and modulates uplink data with the MCS based on the relay information and transmits the result to the RS.

The RS switches between non-regenerative relay and regenerative relay based on the relay information and relays uplink data. In other words, in the case of non-regenerative relay, the RS maintains the MCS, and amplifies uplink data and transmits the result to the BS. Meanwhile, in the case of regenerative relay, the RS once demodulates and decodes uplink data, and encodes and modulates the uplink data again with the MCS based on the relay information and transmits the result to the BS.

Figure 4:
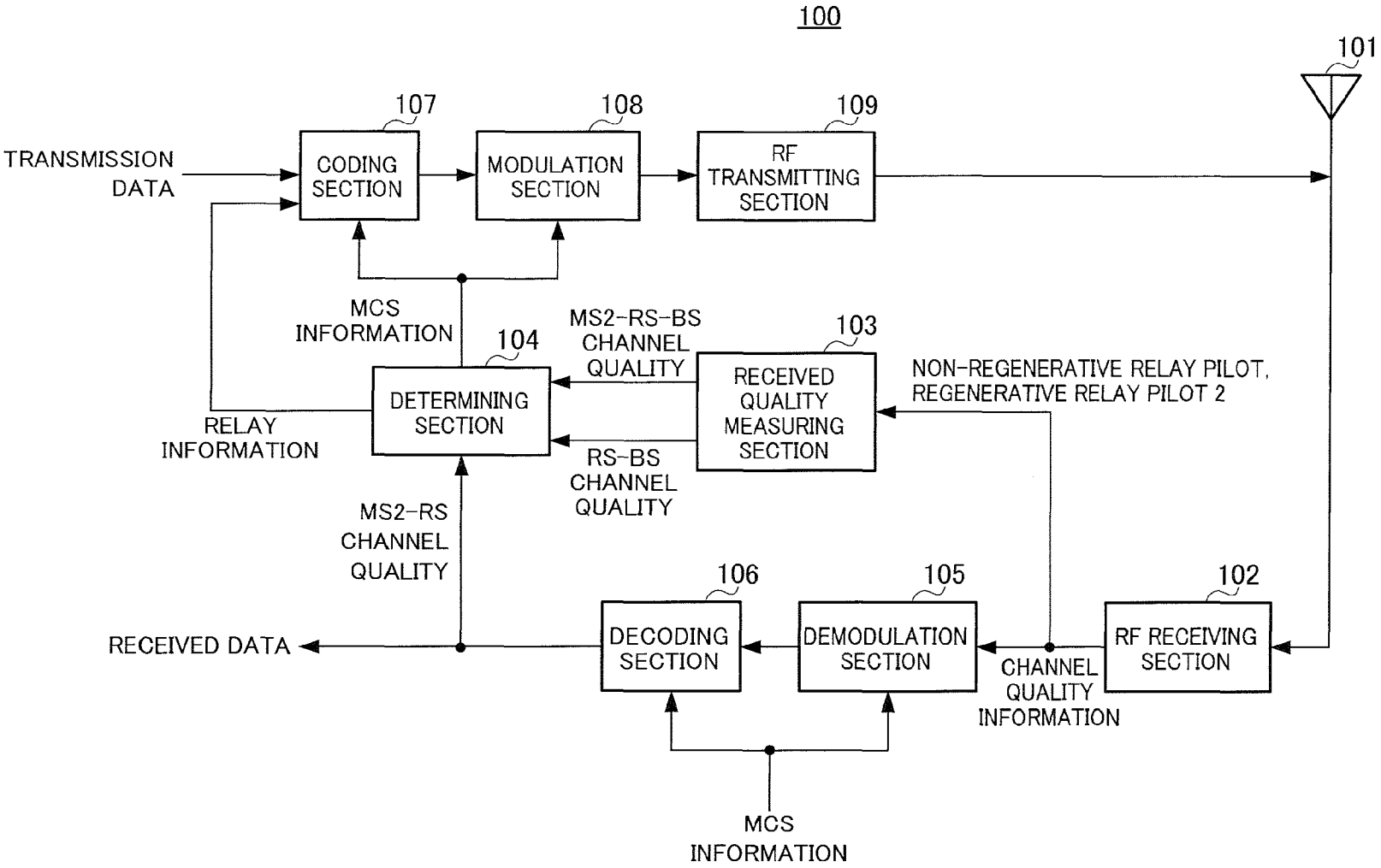
FIG. 4 is a block diagram illustrating a configuration of a base station according to Embodiment 1 of the invention.

Described next is a configuration of the BS (base station) according to this Embodiment. FIG. 4 illustrates the configuration of the BS.

In BS 200 shown in FIG. 4, non-regenerative relay pilot, regenerative relay pilot 2, channel quality information and uplink data, received via antenna 101, are subjected to radio processing such as down-conversion in RF receiving section 102. After the radio processing, non-regenerative relay pilot and regenerative relay pilot 2 are inputted to received quality measuring section 103, and the channel quality information and uplink data are inputted to demodulation section 105.

The channel quality information and the uplink data are demodulated in demodulation section 105 and decoded in decoding section 106 according to the MCS determined in determining section 104. The received data is thereby obtained. Further, the decoded channel quality information (MS2-RS channel quality) is inputted to determining section 104.

Meanwhile, received quality measuring section 103 measures the received quality of non-regenerative relay pilot and regenerative relay pilot 2, and obtains the MS2-RS-BS channel quality and RS-BS channel quality. These kinds of channel quality are inputted to determining section 104. In addition, received quality measuring section 103 is able to distinguish between the non-regenerative relay pilot and regenerative relay pilot 2 by the flags added to the pilot signals.

Determining section 104 determines the relay scheme of the RS and MCS in multi-hop communication from the MS2-RS-BS channel quality, MS2-RS channel quality and RS-BS channel quality. The determination method will be described later. The determination results (the relay scheme and MCS) are inputted to coding section 107 as relay information.

The relay information and the transmission data (downlink data) are encoded in coding section 107 and modulated in modulation section 108 according to the MCS determined in determining section 104. The modulated relay information and the downlink data are subjected to radio processing such as up-conversion in RF transmitting section 109 and then transmitted via antenna 101.

Described next is the method of determining the relay scheme and MCS. In addition, the received SNR is used as channel quality in the following descriptions.

First, determining section 104 classifies channel quality into three stages of "good", "normal", and "poor," as shown in FIG. 5. For the modulation scheme capable of communication in each state, 16QAM is "good", QPSK is "normal", and BPSK is "poor".

Next, determining section 104 refers to a table as shown in FIG. 6, and determines the relay scheme and MCS according to the combination of the MS2-RS channel quality, RS-BS channel quality and MS2-RS-BS channel quality. Determination results are given as relay information of one of "0" to "5" (information of three bits between "000" and "101"). In addition, the table of FIG. 6 shows modulation schemes alone as MCS, without spreading factors, for ease of explanation.

In FIG. 6, for example, when the MS2-RS channel quality is "good", RS-BS channel quality is "good" and MS2-RS-BS channel quality is "normal", it is determined that the relay scheme is non-regenerative relay, and that the modulation scheme is QPSK, and relay information "1" corresponding to this determination result is transmitted. Further, for example, when the MS2-RS channel quality is "normal", RS-BS channel quality is "good" and MS2-RS-BS channel quality is "poor", it is determined that the relay scheme is regenerative relay, and that the modulation scheme is QPSK between the MS2 and RS (MS2-RS), while being 16QAM between the R2 and BS (RS-BS), and the relay information "3" corresponding to this determination result is transmitted.

Described herein are grounds for generation of the table as shown in FIG. 6.

First, the relationships between channel quality and MCS in regenerative relay are shown in the table of FIG. 7. According to these relationships between the channel quality and MCS, "good" refers to 16QAM, "normal" refers to QPSK and "poor" refers to BPSK. Further, the transmission rate "bit/T" indicates the number of bits that can be transmitted per unit time T. Herein, the transmission rate is assumed to be 1 bit/T in the case that QPSK is used both in MS2-RS and RS-BS. Since the number of bits that can be transmitted per symbol in 16QAM is twice that in QPSK, the transmission rate is 2 bits/T when in both MS2-RS and RS-BS 16QAM is used. Furthermore, since the number of bits that can be transmitted per symbol in BPSK is half that in QPSK, the transmission rate is 0.5 bits/T when in both MS2-RS and RS-BS BPSK is used.

Similarly, the relationships between channel quality and MCS in non-regenerative relay are shown in the table of FIG. 8. As described above, regenerative relay has defects that the relay processing needs much time and that the delay by the relay is large as compared with non-regenerative relay. Herein, it is assumed that regenerative relay requires the processing time twice that of non-regenerative relay. Accordingly, when the MCS of MS2-RS-BS is QPSK, the transmission rate is 2 bits/T, and is twice the bit rate in the case of QPSK both in MS2-RS and RS-BS in regenerative relay. In other words, when the same modulation scheme is selected in regenerative relay and non-regenerative relay, the number of bits that can be transmitted per unit time in regenerative relay is half that in non-regenerative relay.

Herein, by comparing FIG. 7 with FIG. 8, it is understood that it is possible to secure the transmission rate at or greater than optimal transmission rates (2 bits/T) of regenerative relay when the channel quality of non-regenerative relay is "normal" or more, and it is possible to combine the table of FIG. 7 and the table of FIG. 8 into a table as shown in FIG. 9. However, the table of FIG. 9 is prepared on the premise that poorer channel quality in regenerative relay is not poorer than channel quality in non-regenerative relay because, in non-regenerative relay, noise is also amplified, while, in regenerative relay, recoding and remodulation are performed in accordance with channel quality. For example, when the MS2-RS channel quality is "good" and the RS-BS channel quality is "poor" in regenerative relay, the MS2-RS-BS channel quality is unlikely to be "normal" or better in non-regenerative relay. Therefore, when the MS-RS channel quality is "good" and the RS-BS channel is "poor" in non-regenerative relay, the table of FIG. 9 omits "good" and "normal" for the MS2-RS-BS channel quality in non-regenerative relay.

Then, based on the table of FIG. 9, the table of FIG. 6 collectively shows selected combinations of relay schemes and MCS that obtain better transmission rates among the same combinations of three kinds of channel quality. In addition, when the transmission rate is the same in the same combinations of channel quality (for example, in the table of FIG. 9, in the case where the MS2-RS channel quality is "good", the RS-BS channel quality is "good", the MS2-RS-BS channel quality is "normal" and the transmission rate is 2 bits/T in regenerative relay and in non-regenerative relay), non-regenerative relay is selected taking into account the fact that the processing load of the relay station is less in non-regenerative relay than in regenerative relay.

Accordingly, by selecting the combinations of relay schemes and MCS based on the table shown in FIG. 6 and by switching the relay schemes and MCS appropriately and performing relay, it is possible to perform multi-hop communication using optimal combinations in accordance with three kinds of channel quality for MS2-RS, RS-BS and MS2-RS-BS, that is, using combinations of relay scheme and MCS that can achieve optimal transmission rates in accordance with three [kids] *kinds* of channel quality, so that, compared to conventional multi-hop communication where relay is always performed using only one relay scheme of either regenerative relay or non-regenerative relay, user throughput can be improved.

Figure 10:
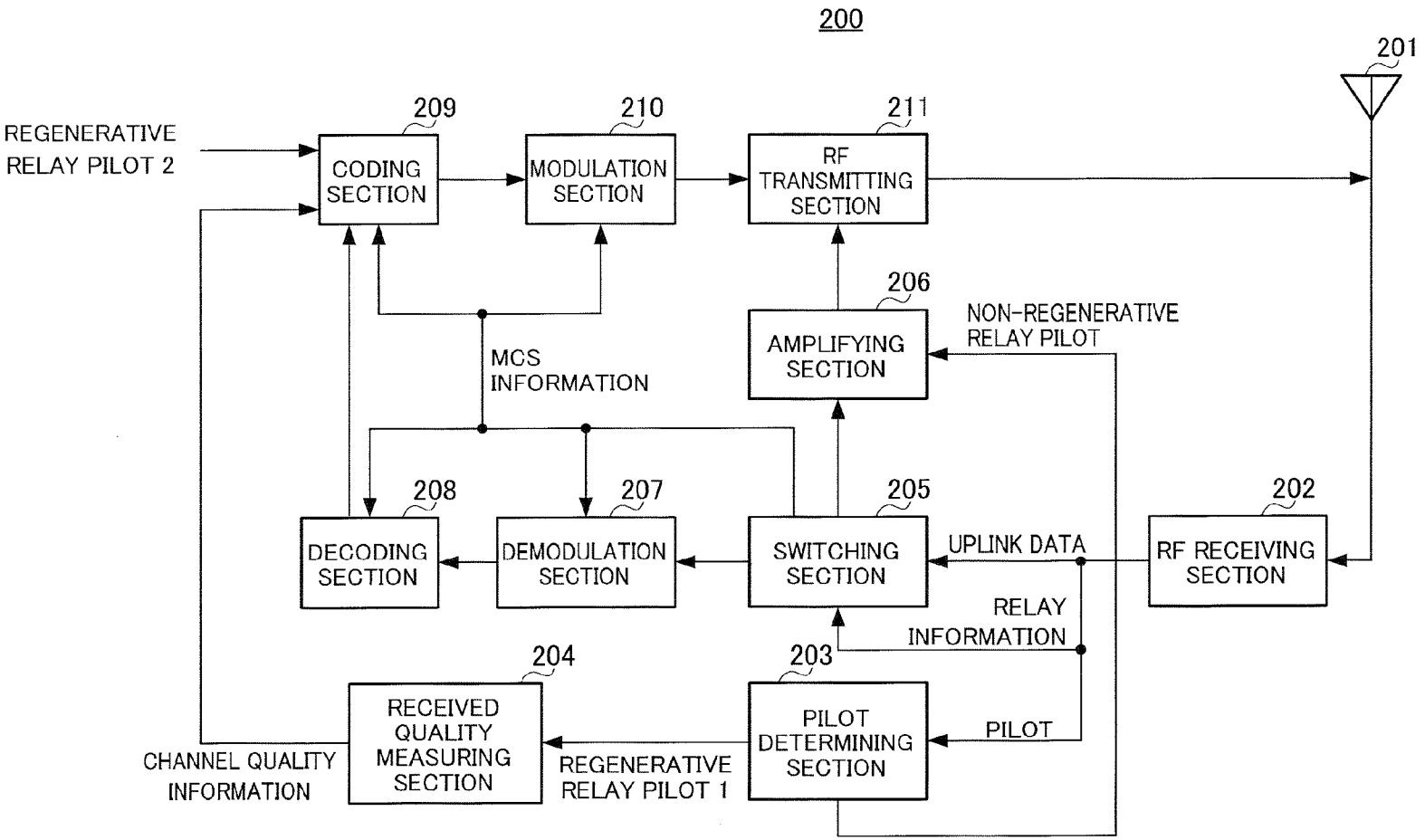
FIG. 10 is a block diagram illustrating a configuration of a relay station according to Embodiment 1 of the invention.

The configuration of the relay station (RS) according to this Embodiment will be described below. FIG. 10 illustrates the configuration of the RS.

In RS200 as shown in FIG. 10, the relay information (information indicative of the combination of the relay scheme and MCS), pilot signals (regenerative relay pilot 1 and non-regenerative relay pilot) and uplink data received in antenna 201 are subjected to radio processing such as down-conversion and the like in RF receiving section 202. In addition, the relay information is received from the BS, and the pilot signals and uplink data are received from the MS2. After the radio processing, the pilot signals are inputted to pilot decision section 203, and the relay information and uplink data are inputted to switching section 205.

Based on the flags added to the pilot signals, decision section 203 determines whether the pilot is regenerative relay pilot 1 or non-regenerative pilot, and inputs regenerative relay pilot 1 to received quality measuring section 204, while inputting non-regenerative relay pilot to amplifying section 206.

Received quality measuring section 204 measures the received quality of regenerative relay pilot 1, and obtains the MS2-RS channel quality. Then, the channel quality information indicating the obtained channel quality is inputted to coding section 209.

Switching section 205 has a table (part of the table of FIG. 6) indicative of the relationships between relay information and relay schemes/MCS, and, according to input relay information, selects a combination of the relay scheme and MCS and switches regenerative relay and non-regenerative relay. For example, referring to the table of FIG. 6, when relay information is "1", the RS relays data by non-regenerative relay, and QPSK is used both in MS2-RS and RS-BS. Accordingly, when relay information is "1", since the RS relays data by non-regenerative relay, uplink data is inputted to amplifying section 206. Meanwhile, for example, when relay information is "4", since the RS relays data by regenerative relay, and 16QAM is used in MS2-RS while QPSK is used in RS-BS, uplink data is inputted to demodulation section 207. Further, switching section 205 inputs information about the selected MCS to demodulation section 207, decoding section 208, coding section 209 and modulation section 210.

Amplifying section 206 amplifies the uplink data and non-regenerative relay pilot to inputted to RF transmitting section 211.

Meanwhile, the uplink data inputted to demodulation section 207 is demodulated in demodulation section 207 and decoded in decoding 208 according to the MCS of MS2-RS designated by switching section 205. The result is encoded again in coding section 209 and modulated again in modulation section 210 according to the MCS of RS-BS designated by switching section 205. The modulated uplink data is inputted to RF transmitting section 211.

Meanwhile, channel quality information and regenerative relay pilot 2 are encoded in coding section 209, modulated in modulation section 210, and then inputted to RF transmitting section 211.

The uplink data (to be relayed in regenerative relay) inputted from modulation section 210 and the uplink data (to be relayed in non-regenerative relay) inputted from amplifying section 206 are subjected to radio processing such as up-conversion in RF transmitting section 211 and then transmitted to the BS via antenna 201. Further, channel quality information, regenerative relay pilot 2 and non-regenerative relay pilot are also subjected to radio processing such as up-conversion in RF transmitting section 211, and then transmitted to the BS via antenna 201. In addition, the relay information is transmitted to the MS2 in the relay scheme for the downlink data switched in the same way as uplink data.

Figure 11:
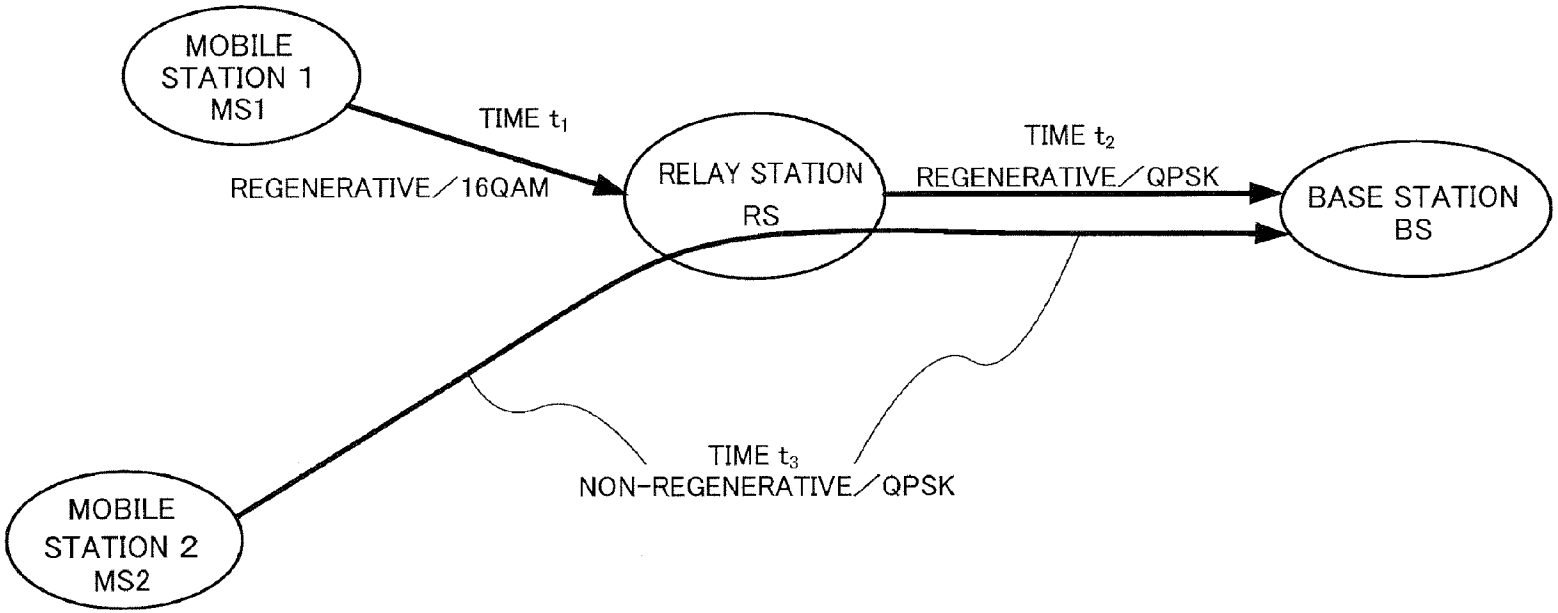
FIG. 11 is a schematic diagram illustrating the multi-hop communication system according to Embodiment 1 of the invention.

As shown in FIG. 11, with the above-described BS and RS, when a MS2 newly joins in while communication is in progress between a MS1 and a BS via a RS by regenerative relay, multi-hop communication is made possible for the MS2 using the combination (non-regenerative relay/QPSK in FIG. 11) of a relay scheme and MCS capable of obtaining optimal transmission rates according to three kinds of channel quality, MS2-RS, RS-BS and MS2-RS-BS channel quality. Thus, by performing a relay capable of obtaining optimal transmission rates to the MS2, it is possible to maintain system throughput even when the MS2 newly joins in. Further, in particular, when non-regenerative relay is performed with the MS2, since the processing delay of non-regenerative relay is less than that of regenerative relay, communication occasions for the MS1 increase compared to the case of performing regenerative relay with the MS2, so that it is possible to prevent user throughput of the MS1 from decreasing. Furthermore, by decreases in the processing delay due to application of non-regenerative relay to the MS2, the system throughput can be increased.

In addition, when multiplexing schemes such as code division multiplex (CDM) and space division multiplex (SDM) are used in communications between the MS and RS, it is also possible to use the table shown in FIG. 12 instead of the table in FIG. 6.

Figure 13:
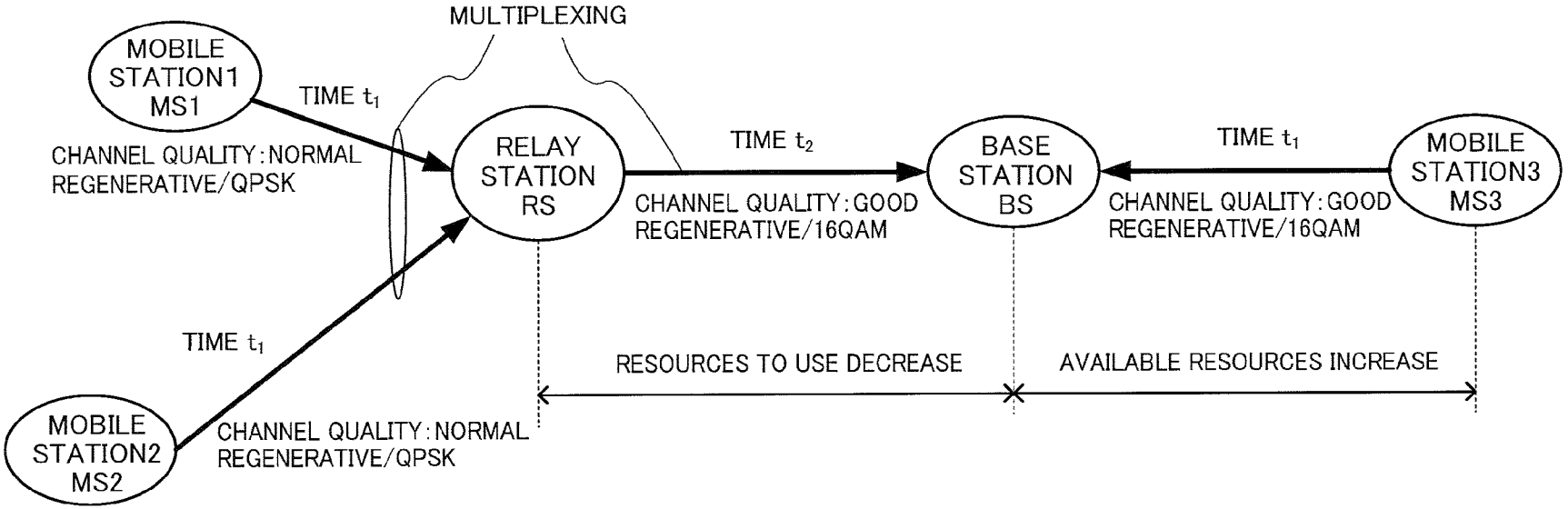
FIG. 13 is another schematic diagram illustrating the multi-hop communication system according to Embodiment 1 of the invention.

In the table shown in FIG. 12, non-regenerative relay is adopted only when the RS-BS channel quality in regenerative relay is the same as the MS-RS-BS channel quality in non-regenerative relay. By using such a table, when the RS-BS channel quality is better than the MS-RS channel quality when regenerative relay is employed, it is possible to make the transmission rate between the RS and BS better than the transmission rate between the MS and the RS. Accordingly, as shown in FIG. 13, it is possible to multiplex the data of MS1-RS and the data of MS2-RS and transmit, and, as a result, it is possible to reduce the resources used between the RS and the BS. Further, by reducing the resources used between the RS and the BS, resources that can be used by another MS (MS3) connecting with the BS increase, and it is thus possible to further improve system throughput.

Further, when the MS2 is present in the service area of the BS, it is also possible to use a table as shown in FIG. 14, instead of the table of FIG. 6.

In the table shown in FIG. 14, in addition to the channel quality (MS2-RS channel quality and RS-BS channel quality) in regenerative relay and the channel quality (MS-RS-BS channel quality) in non-regenerative relay, channel quality (MS2-BS channel quality) in the case of direct connection between the MS2 and the BS without using the RS is also notified to the BS, and, from these kinds of channel quality, the BS determines one of direct connection, regenerative relay and non-regenerative relay to perform between the MS2 and B2 and MCS. In addition, in the case of direct connection, relay information is set for "0" irrespective of the MCS. By using such a table, when the channel quality is poor in communications via the RS, by directly connecting between the MS2 and the BS, it is possible to further improve system throughput.

Embodiment 2

In this Embodiment, in regenerative relay, the RS determines MCS between the MS and the RS.

Figure 15:
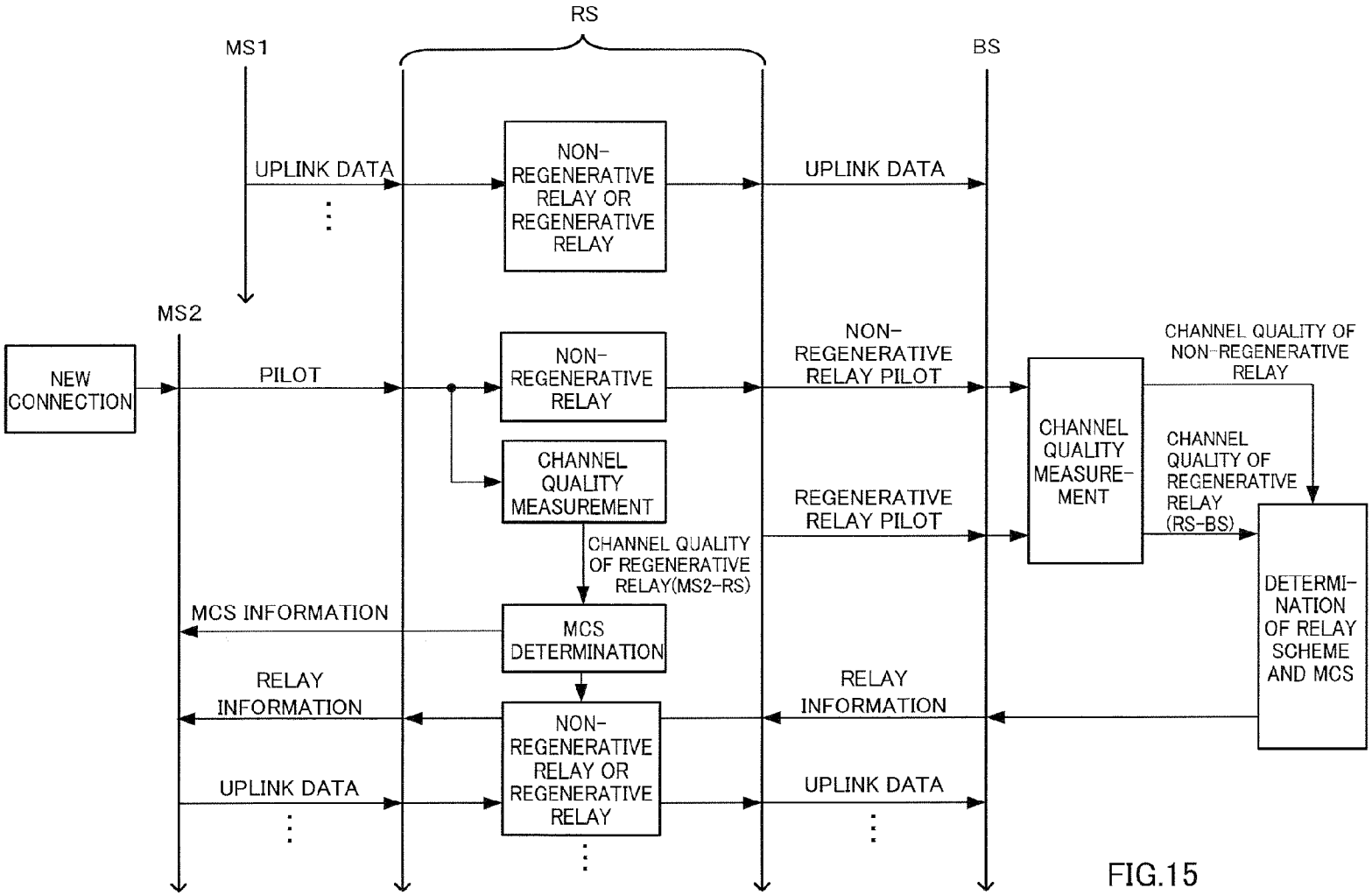
FIG. 15 is an operation sequence in a multi-hop communication system according to Embodiment 2 of the invention.

Described first is an operation sequence in a multi-hop communication system according to this Embodiment. The operation sequence is shown in FIG. 15. FIG. 15 shows a case where the MS2 newly joins in while communication is in progress between the MS1 and the BS via the RS. In addition, to avoid complexity in descriptions, the following descriptions will be limited to uplink data multi-hop communication, but downlink data multi-hop communication is performed in the same manner as with uplink data.

Upon newly joining in, the MS2 transmits a pilot signal to measure both the MS2-RS channel quality and MS2-RS-BS channel quality to the RS. This pilot signal is a pilot shared between regenerative relay and non-regenerative relay, and so the flag for distinguishing between the regenerative relay pilot and the non-regenerative relay pilot is not added.

The RS receiving this pilot signal performs non-regenerative relay processing on the pilot to transmit to the BS as a non-regenerative relay pilot. In other words, the RS maintains the MCS and amplifies the pilot and transmits the result to the BS. At this point, the RS adds a flag indicative of non-regenerative relay pilot to non-regenerative relay pilot. Further, the RS measures the received quality (MS2-RS channel quality) of the received pilot, and, according to the channel quality, selects the MCS for between the MS2 and the RS in regenerative relay. The RS selects 16QAM when the channel quality is "good", QPSK when the channel quality is "normal", or BPSK when the channel quality is "poor". The selection result is transmitted to the MS2 as MCS information. Further, the RS transmits a new pilot signal (regenerative relay pilot) to measure the RS-BS channel quality to the BS. At this point, the RS adds a flag indicative of regenerative relay pilot to regenerative relay pilot.

Next, the BS measures the received quality (MS2-RS-BS channel quality) of non-regenerative relay pilot. Further, the BS measures the received quality (RS-BS channel quality) of regenerative relay pilot. By this means, the BS obtains the MS2-RS-BS channel quality as the channel quality of non-regenerative relay, and further obtains the RS-BS channel quality as the channel quality of regenerative relay. Then, based on these two kinds of channel quality, the BS determines the relay scheme for the RS (whether the RS performs regenerative relay or non-regenerative relay), and further determines the MCS for between the RS and the BS in regenerative relay or determines the MCS for between the MS2 and the BS via the RS in non-regenerative relay. The determination result is transmitted to the RS as relay information. Further, this relay information is also transmitted to the MS2 via the RS.

In the case of regenerative relay, the MS2 performs coding and modulation on the uplink data with the MCS based on the MCS information transmitted from the RS to transmit to the RS. Meanwhile, in the case of non-regenerative relay, the MS2 performs coding and modulation on the uplink data with the MCS based on the relay information transmitted from the BS to transmit to the RS.

The RS switches non-regenerative relay and regenerative relay based on the relay information to relay the uplink data. In other words, in the case of non-regenerative relay, the RS maintains the MCS and amplifies the uplink data and transmits the result to the BS. Meanwhile, in the case of regenerative relay, the RS once demodulates and decodes the uplink data with the MCS determined by the RS, and performs coding and modulation again on the uplink data with the MCS based on the relay information to transmit to the BS. In addition, for the downlink data, in the case of regenerative relay, the RS once demodulates and decodes the downlink data from the BS, and performs coding and modulation again on the downlink data with the MCS determined by the RS to transmit to the MS2.

Figure 16:
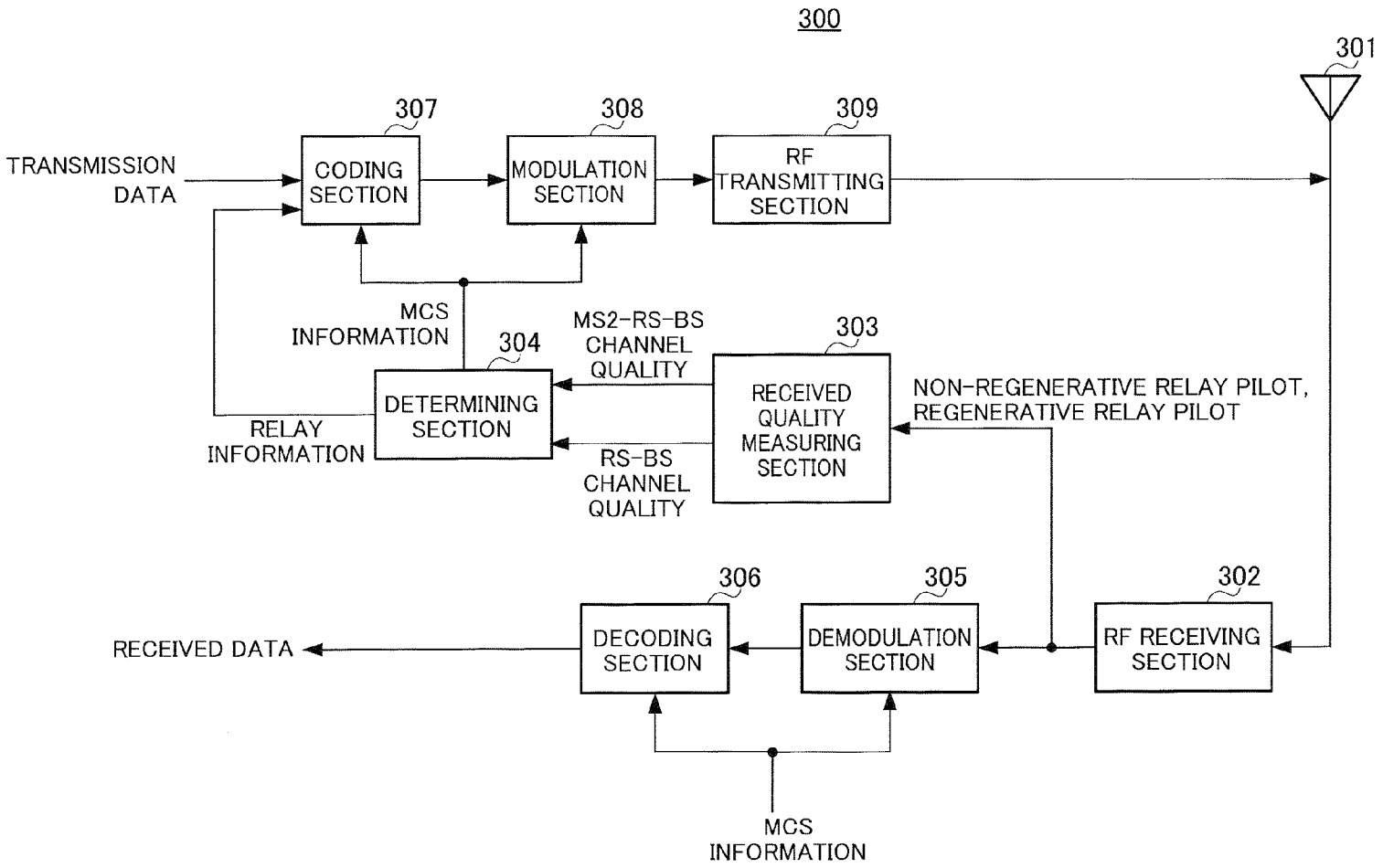
FIG. 16 is a block diagram illustrating a configuration of a base station according to Embodiment 2 of the invention.

Described next is a configuration of the BS (base station) according to this Embodiment. FIG. 16 illustrates the configuration of the BS.

In BS 300 as shown in FIG. 16, non-regenerative relay pilot, regenerative relay pilot and uplink data received via antenna 301 are subjected to radio processing such as down-conversion in RF receiving section 302. After the radio processing, non-regenerative relay pilot and regenerative relay pilot are inputted to received quality measuring section 303, and the uplink data is inputted to demodulation section 305.

The uplink data is demodulated in demodulation section 305 and decoded in decoding section 306 according to MCS determined in determining section 304. The received data is thereby obtained.

Meanwhile, received quality measuring section 303 measures the received quality of non-regenerative relay pilot and regenerative relay pilot, and obtains the MS2-RS-BS channel quality and RS-BS channel quality. These kinds of channel quality are inputted to determining section 304. In addition, received quality measuring section 303 is capable of distinguishing between the non-regenerative relay pilot and the regenerative relay pilot by the flag added to each pilot.

Determining section 304 determines the relay scheme of the RS and MCS from the MS2-RS-BS channel quality and RS-BS channel quality. The determination method will be described later. The determination results (relay scheme and MCS) are inputted to coding section 307 as relay information.

The relay information and transmission data (downlink data) are encoded in coding section 307 and modulated in modulation section 308 according to the MCS determined in determining section 304. The modulated relay information and downlink data are subjected to radio processing such as up-conversion in RF transmitting section 309, and transmitted via antenna 301.

Described next is the method of determining the relay scheme and MCS. In addition, the received SNR is used as channel quality in the following descriptions.

First, determining section 304 classifies channel quality into three stages, "good", "normal", and "poor," as shown in FIG. 5. For the modulation scheme capable of communication in each state, 16QAM is "good", QPSK is "normal" and BPSK is "poor".

Next, determining section 304 refers to the table shown in FIG. 17, and determines the relay scheme and MCS corresponding according to the combination of the RS-BS channel quality and MS2-RS-BS channel quality. Determination results are given as relay information of one of "0" to "4" (information of three bits between "000" and "100"). In addition, the table of FIG. 17 shows modulation schemes alone as MCS, without spreading factors, for ease of explanation.

Based on the table of FIG. 9, the table of FIG. 17 collectively shows selected combinations of the relay scheme and MCS that obtain optimal transmission rates for combinations of the RS-BS channel quality and the MS2-RS-BS channel quality. In addition, when a plurality of optimal transmission rates exist for the same combination of channel quality (for example, in the table of FIG. 9, in the case where the RS-BS channel quality is "good", the MS2-RS-BS channel quality is "normal", and the optimal transmission rate is 2 bits/T in both regenerative relay and non-regenerative relay), non-regenerative relay is selected taking into account the fact that the processing load of the relay station is less in non-regenerative relay than in regenerative relay.

Further, when regenerative relay is selected as the relay scheme that obtains optimal transmission rates based on FIG. 9, in FIG. 17, the RS determines the MCS for between the MS2 and the RS according to the MS2-RS channel quality. For example, when the RS-BS channel quality is "good" or "normal", and the MS2-RS-BS channel quality is "poor", the optimal transmission rate is obtained in regenerative relay. In addition, in this case, in FIG. 17, in contrast to the MCS for between the RS and the BS being selected based on FIG. 9, the MCS for between the MS2 and the RS is determined by the RS according to the MS2-RS channel quality.

Figure 18:
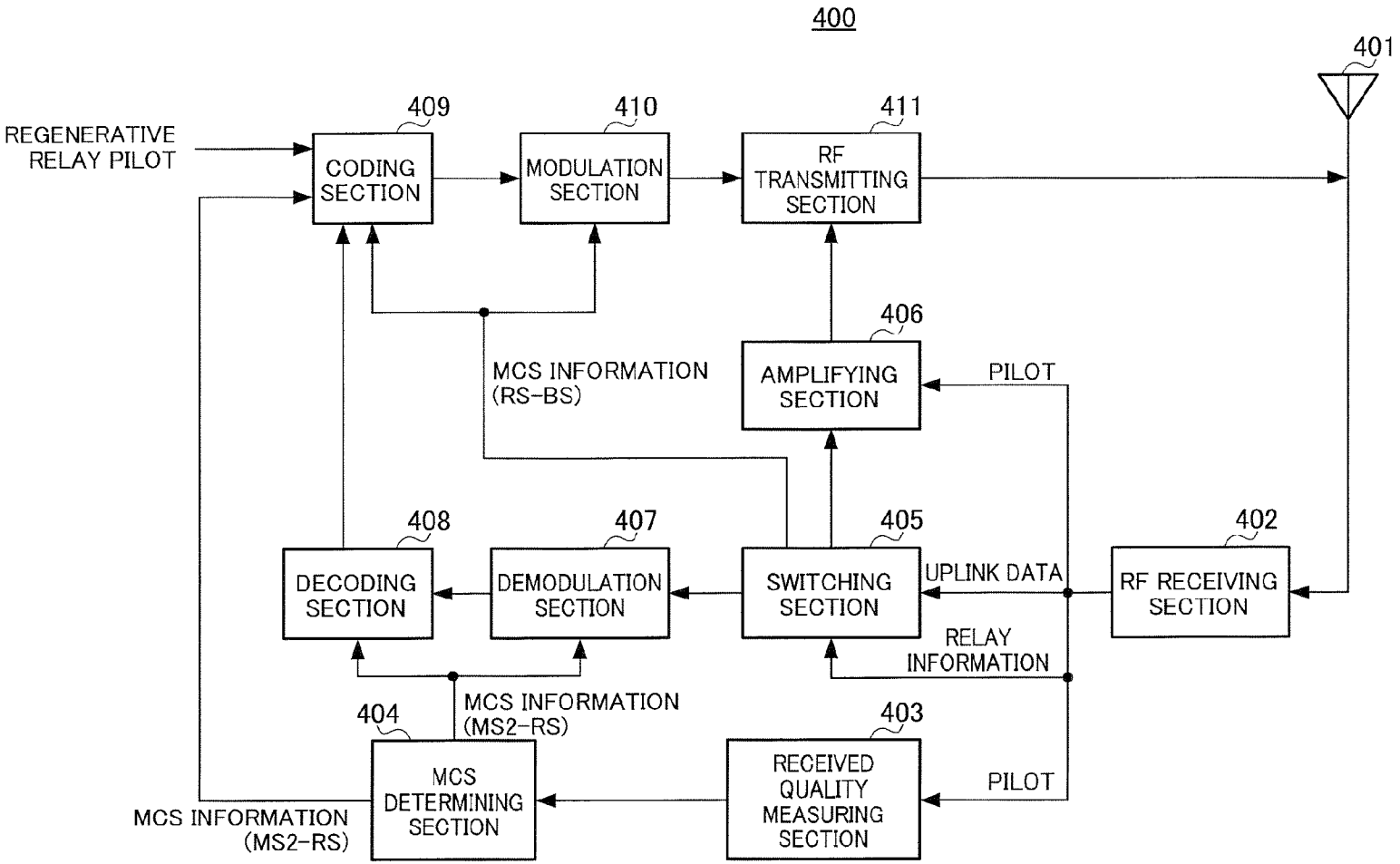
FIG. 18 is a block diagram illustrating a configuration of a relay station according to Embodiment 2 of the invention.

The configuration of the RS (relay station) according to this Embodiment will be described below. FIG. 18 illustrates the configuration of the RS.

In RS400 as shown in FIG. 18, the relay information, pilot signal and uplink data received in antenna 401 are subjected to radio processing such as down-conversion in RF receiving section 402. After the radio processing, the pilot signal is inputted to received quality measuring section 403 and amplifying section 406, and the relay information and uplink data are inputted to switching section 405. In addition, the relay information is received from the BS, and the pilot and uplink data are received from the MS2.

Received quality measuring section 403 measures the received quality of the pilot, and obtains the MS2-RS channel quality.

Based on the MS2-RS channel quality, MCS determining section 404 determines the MCS for between the MS2 and the RS, and inputs MCS information to demodulation section 407 and decoding section 408. Further, the MCS information for between the MS2 and the RS is inputted to coding section 409 to be notified to the MS2.

Switching section 405 has a table (part of the table of FIG. 17) indicative of the relationships between relay information and relay schemes/MCS, and, according to input relay information, selects a combination of a relay scheme and MCS to switch regenerative relay and non-regenerative relay. In the case of non-regenerative relay, uplink data is inputted to amplifying section 406. In the case of regenerative relay, uplink data is inputted to demodulation section 407.

Amplifying section 406 amplifies uplink data and pilot to input to RF transmitting section 411.

Meanwhile, the uplink data inputted to demodulation section 407 is demodulated in demodulation section 407 and decoded in decoding 408 according to the MCS of MS2-RS designated by MCS determining section 404. The result is encoded again in coding section 409 and modulated again in modulation section 410 according to the MCS of RS-BS designated by switching section 405. The modulated uplink data is inputted to RF transmitting section 411.

Meanwhile, regenerative relay pilot and the MCS information of MS2-RS are encoded in coding section 409, modulated in modulation section 410, and inputted to RF transmitting section 411.

The uplink data (to be relayed in regenerative relay) inputted from modulation section 410 and the uplink data (to be relayed in non-regenerative relay) inputted from amplifying section 406 are subjected to radio processing such as up-conversion in RF transmitting section 411, and transmitted to the BS via antenna 401. Further, regenerative relay pilot, and the pilot (non-regenerative relay pilot) amplified in amplifying section 406 are also subjected to the radio processing such as up-conversion in RF transmitting section 411, and transmitted to the BS via antenna 401. Furthermore, the MCS information of MS2-RS is subjected to the radio processing such as up-conversion in RF transmitting section 411, and transmitted to the MS2 via antenna 401. In addition, the relay information is transmitted to the MS2 in the relay scheme of the downlink data switched in the same way as in the uplink data.

In addition, as in Embodiment 1, when multiplexing schemes such as CDM and SDM are used in communications between the MS and the RS, it is also possible to use the table shown in FIG. 19 instead of the table in FIG. 17. In the table shown in FIG. 19, as in Embodiment 1, non-regenerative relay is adopted only when the RS-BS channel quality in regenerative relay is the same as the MS-RS-BS channel quality in non-regenerative relay. Further, when the MS2 is present in the service area of the BS, as in Embodiment 1, it is also possible to use a table as shown in FIG. 20, instead of the table of FIG. 17.

Thus, according to this Embodiment, as in Embodiment 1, it is possible to improve system throughput, while preventing the user throughput from decreasing. Further, in this Embodiment, the RS determines the MCS for between the MS and the RS in regenerative relay. Therefore, as compared with Embodiment 1, it is possible to decrease the number of pilots that the MS transmits, while the need is eliminated of the RS transmitting the BS-RS channel quality to the BS, and the system throughput can thus be further increased.

In addition, in the above-mentioned Embodiment, each table is generated so as to maximize the transmission rate, but it is possible to generate each table according to various requirements of the communication system, such as "meeting a data rate of minimum 1 Mbps", "transmission rate that meets BER=0.01 at SNR=15 dB", and so on.

Further, although examples have been explained in the above-mentioned Embodiments where the base station determines the relay scheme and MCS, the relay station or mobile station may hold the reference table to determine the relay scheme and MCS.

Although with the above embodiments cases have been described where the present invention is configured by hardware, the present invention may be implemented by software.

Each function block employed in the description of each of the aforementioned embodiments may typically be implemented as an LSI constituted by an integrated circuit. These may be individual chips or partially or totally contained on a single chip.

"LSI" is adopted here but this may also be referred to as "IC", "system LSI", "super LSI", or "ultra LSI" depending on differing extents of integration.

Further, the method of circuit integration is not limited to LSI's, and implementation using dedicated circuitry or general purpose processors is also possible. After LSI manufacture, utilization of an FPGA (Field Programmable Gate Array) or a reconfigurable processor where connections and settings of circuit cells within an LSI can be reconfigured is also possible.

Further, if integrated circuit technology comes out to replace LSI's as a result of the advancement of semiconductor technology or a derivative other technology, it is naturally also possible to carry out function block integration using this technology. Application of biotechnology is also possible.

The present application is based on Japanese Patent Application No.2005-071775, filed on Mar. 14, 2005, the entire content of which is expressly incorporated by reference herein.

INDUSTRIAL APPLICABILITY

The present invention is suitable for use in a mobile communication system using a high-frequency radio band.

The invention claimed is:

[1. A wireless communication system, comprising:

a mobile station;

a base station; and a relay station, wherein the mobile station and the base station communicate via the relay station, wherein:

the relay station is configured for both a first relay scheme of a non-regenerative relay for amplifying a signal without changing a modulation scheme and performing a relay transmission, and a second relay scheme of a regenerative relay for changing the modulation scheme of the signal according to a channel quality and performing the relay transmission, and the relay station switches between the first and second relay schemes based on a combination of a first channel quality in the non-regenerative relay and a second channel quality in the regenerative relay.]

[2. The wireless communication system according to claim 1, wherein the base station comprises a table providing a relationship between the combination of the first channel quality in the non-regenerative relay and the second channel quality in the regenerative relay and the first and second relay schemes, and determines a relay scheme to be employed, with reference to the table.]

[3. The wireless communication system according to claim 2, wherein the base station transmits relay information indicating the determined relay scheme to the relay station.]

[4. The wireless communication system according to claim 1, wherein the relay station transmits a pilot signal for employment in a channel quality measurement to the base station in the non-regenerative relay, measures a channel quality between the mobile station and the relay station from the pilot signal as the second channel quality in the regenerative relay, and transmits a new pilot signal for employment in the channel quality measurement to the base station.]

[5. The wireless communication system according to claim 4, wherein the relay station transmits information indicating the measured channel quality to the base station.]

[6. The wireless communication system according to claim 1, wherein, when the regenerative relay is employed, the relay station determines a modulation scheme for a communication between the mobile station and the relay station.]

[7. A relay station apparatus switching between two relay schemes of a non-regenerative relay for amplifying a signal from a mobile station apparatus without changing a modulation scheme and performing a relay transmission, and a regenerative relay for changing the modulation scheme of the signal from the mobile station apparatus according to a channel quality and performing the relay transmission, the relay station apparatus comprising:

an amplifying section that amplifies the signal from the mobile station apparatus;

a demodulation section that demodulates the signal from the mobile station apparatus;

a modulation section that modulates the signal demodulated by the demodulation section using a modulation scheme in accordance with the channel quality;

a transmission section that transmits the signal amplified by the amplifying section or the signal modulated by the modulation section; and a switching section that switches between the two relay schemes based on a combination of a first channel quality in the non-regenerative relay and a second channel quality in the regenerative relay, and outputs an input signal to the amplifying section when the non-regenerative relay is employed and outputs the input signal to the demodulation section when the regenerative relay is employed.]

[8. The relay station apparatus according to claim 7, further comprising:

a receiving section that receives a pilot signal for employment in channel quality measurement from the mobile station apparatus; and a measuring section that measures a channel quality between the mobile station apparatus and the relay station apparatus from the pilot signal as the second channel quality in the regenerative relay.]

[9. The relay station apparatus according to claim 8, wherein the transmission section transmits the pilot signal to the base station in the non-regenerative relay and transmits a new pilot signal for employment in the channel quality measurement to the base station apparatus.]

[10. The relay station apparatus according to claim 8, wherein the transmission section further transmits information indicating the measured channel quality to the base station apparatus.]

[11. The relay station apparatus according to claim 7, wherein, when the regenerative relay is employed, the switching section determines a modulation scheme for a communication between the mobile station apparatus and the relay station apparatus.]

[12. The relay station apparatus according to claim 7, further comprising a receiving section that receives relay information indicating a relay scheme determined based on a relationship between the combination of the first channel quality in the non-regenerative relay and the second channel quality in the regenerative relay and the two relay schemes, and wherein the switching section switches between the two relay schemes according to the relay information.]

[13. The relay station apparatus according to claim 12, further comprising a table providing a relationship between the relay information and the two relay schemes, and wherein the switching section switches between the two relay schemes with reference to the table.]

[14. A wireless communication system, comprising:

a mobile station;

a base station; and a relay station, wherein the mobile station and the base station communicate via the relay station, wherein:

the relay station switches between two relay schemes of a non-regenerative relay for amplifying a signal without changing a modulation scheme and performing a relay transmission, and a regenerative relay for changing the modulation scheme of the signal according to a channel quality and performing a relay transmission, based on a combination of a first channel quality in the non-regenerative relay and a second channel quality in the regenerative relay; and the base station comprises a table providing a relationship between the combination of the first channel quality in the non-regenerative relay and the second channel quality in the regenerative relay and the two relay schemes, and determines a relay scheme to be employed, with reference to the table.]

[15. The wireless communication system according to claim 14, wherein the base station transmits relay information indicating the determined relay scheme to the relay station.]

*16. An integrated circuit configured to control a relay station apparatus to select from two relay schemes of a non-regenerative relay for amplifying a signal transmitted from a transmission apparatus without regenerating the signal with a decoding-reencoding process and performing a relay transmission of the amplified signal, and a regenerative relay for regenerating a signal transmitted from the transmission apparatus with a decoding-reencoding process and performing a relay transmission of the regenerated signal, the integrated circuit comprising:*

*an amplifying section configured to control amplification of the signal transmitted from the transmission apparatus when the non-regenerative relay is employed;*

*a decoding section configured to control decoding of the signal transmitted from the transmission apparatus when the regenerative relay is employed;*

*an encoding section configured to control reencoding of the signal decoded by the decoding section to generate a regenerated signal; and*

*a transmission section configured to control transmission of the amplified signal or the regenerated signal depending on a combination of a first channel quality in the non-regenerative relay and a second channel quality in the regenerative relay.*

*17. The integrated circuit according to claim 16, further comprising:*

*a reception section configured to control reception of a pilot signal for employment in channel quality measurement from the transmission apparatus; and*

*a measuring section configured to control measurement of a channel quality between the transmission apparatus and the relay station apparatus from the pilot signal as the second channel quality in the regenerative relay.*

*18. The integrated circuit according to claim 17, wherein the transmission section transmits the pilot signal to a reception apparatus in the non-regenerative relay and transmits a new pilot signal for employment in the channel quality measurement to the reception apparatus.*

*19. The integrated circuit according to claim 17, wherein the transmission section further transmits information indicating the measured channel quality to a reception apparatus.*

*20. The integrated circuit according to claim 16, wherein, when the regenerative relay is employed, a modulation scheme for a communication between the transmission apparatus and the relay station apparatus is determined.*

*21. The integrated circuit according to claim 16, further comprising a reception section configured to control reception of relay information indicating a relay scheme determined based on a relationship between the combination of the first channel quality in the non-regenerative relay and the second channel quality in the regenerative relay and the two relay schemes,*

*wherein one of the two relay schemes is selected according to the relay information.*

*22. The integrated circuit according to claim 21, further comprising a table providing a relationship between the relay information and the two relay schemes,*

*wherein one of the two relay schemes is selected with reference to the table.*

*23. An integrated circuit configured to control a base station apparatus to communicate with a mobile station apparatus via a relay station apparatus, the integrated circuit comprising:*

*a receiving section configured to control reception of a first pilot signal for employment in a first channel quality measurement between the mobile station apparatus and the base station apparatus in a non-regenerative relay, and reception of a second pilot signal for employment in a second channel quality measurement between the relay station apparatus and the base station apparatus in a regenerative relay, wherein the non-regenerative relay is for amplifying a signal without regenerating the signal with a decoding-reencoding process, and the regenerative relay is for regenerating a signal with a decoding-reencoding process;*

*a measuring section configured to control measurement of the first channel quality using the first pilot signal transmitted in the non-regenerative relay, and to control measurement of the second channel quality using the second pilot signal transmitted in the regenerative relay;*

*a determining section configured to control determination of a relay scheme to be selected by the relay station apparatus, between the non-regenerative relay or the regenerative relay, based on the first channel quality in the non-regenerative relay and the second channel quality in the regenerative relay; and*

*a transmission section configured to control transmission of relay information indicating the determined relay scheme to the relay station apparatus.*

*24. The integrated circuit according to claim 23, further comprising a table providing a relationship between a combination of the first channel quality in the non-regenerative relay and the second channel quality in the regenerative relay and two relay schemes of the non-regenerative relay and the regenerative relay,*

*wherein the relay scheme is determined with reference to the table.*

* * * * *